United States Patent
Wu et al.

(10) Patent No.: US 8,527,540 B2
(45) Date of Patent: Sep. 3, 2013

(54) AUGMENTING A REPORT WITH METADATA FOR EXPORT TO A NON-REPORT DOCUMENT

(75) Inventors: Ju Wu, Coquitlam (CA); Yan Dong, Coquitlam (CA); Prashantha Ramachandra Shet, Richmond (CA); Patrick Yee Cheuk Cheng, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 1499 days.

(21) Appl. No.: 11/318,074

(22) Filed: Dec. 23, 2005

(65) Prior Publication Data

US 2006/0271508 A1 Nov. 30, 2006

Related U.S. Application Data

(63) Continuation-in-part of application No. 11/137,710, filed on May 24, 2005, now abandoned.

(60) Provisional application No. 60/719,790, filed on Sep. 23, 2005.

(51) Int. Cl.
*G06F 7/00* (2006.01)
*G06F 17/30* (2006.01)

(52) U.S. Cl.
USPC .......................................... 707/783; 713/179

(58) Field of Classification Search
None
See application file for complete search history.

(56) References Cited

U.S. PATENT DOCUMENTS

| | | | | |
|---|---|---|---|---|
| 4,454,576 | A | * | 6/1984 | McInroy et al. ............... 715/201 |
| 5,132,899 | A | | 7/1992 | Fox |
| 5,257,185 | A | | 10/1993 | Farley et al. |
| 5,555,403 | A | | 9/1996 | Cambot et al. |
| 5,606,609 | A | * | 2/1997 | Houser et al. ................... 713/179 |
| 5,630,122 | A | * | 5/1997 | Kaplan et al. ..................... 707/4 |
| 5,634,122 | A | | 5/1997 | Loucks et al. |
| 5,664,182 | A | * | 9/1997 | Nierenberg et al. ........... 707/102 |
| 5,710,900 | A | | 1/1998 | Anand et al. |
| 5,787,416 | A | | 7/1998 | Tabb et al. |
| 5,801,702 | A | | 9/1998 | Dolan et al. |
| 5,819,263 | A | * | 10/1998 | Bromley et al. ..................... 1/1 |
| 5,832,504 | A | | 11/1998 | Tripathi et al. |
| 5,978,818 | A | | 11/1999 | Lin |
| 6,073,129 | A | * | 6/2000 | Levine et al. ..................... 707/4 |

(Continued)

FOREIGN PATENT DOCUMENTS

| | | |
|---|---|---|
| CA | 2151654 | 12/1996 |
| EP | 840240 A2 * | 5/1998 |

(Continued)

OTHER PUBLICATIONS

"Diagra Graphics Server" ReportLab Europe Ltd., retrieved from the Internet at <http://www.reportlab.com/docs/diagra-ds.pdf>, document dated Aug. 2001, pp. 1-7.

(Continued)

*Primary Examiner* — Augustine K Obisesan
(74) *Attorney, Agent, or Firm* — Mintz, Levin, Cohn, Ferris, Glovsky and Popeo, P.C.

(57) ABSTRACT

A computer readable medium includes executable instructions to create a report; augment the report with metadata including a report identifier and parameter information; and export the report and metadata to a non-report electronic document.

13 Claims, 4 Drawing Sheets

(56) References Cited

U.S. PATENT DOCUMENTS

| | | | |
|---|---|---|---|
| 6,078,924 A * | 6/2000 | Ainsbury et al. ................. 1/1 |
| 6,081,810 A | 6/2000 | Rosenzweig et al. |
| 6,088,718 A | 7/2000 | Altschuler et al. |
| 6,098,081 A | 8/2000 | Heidorn et al. |
| 6,108,636 A * | 8/2000 | Yap et al. ........................ 705/5 |
| 6,154,766 A | 11/2000 | Yost et al. |
| 6,160,549 A | 12/2000 | Touma et al. |
| 6,185,560 B1 | 2/2001 | Young et al. |
| 6,212,524 B1 * | 4/2001 | Weissman et al. ............ 707/101 |
| 6,247,008 B1 | 6/2001 | Cambot et al. |
| 6,360,246 B1 | 3/2002 | Begley et al. |
| 6,460,058 B2 | 10/2002 | Koppolu et al. |
| 6,477,529 B1 | 11/2002 | Mousseau et al. |
| 6,519,571 B1 | 2/2003 | Guheen et al. |
| 6,549,906 B1 * | 4/2003 | Austin et al. ................... 707/10 |
| 6,578,027 B2 | 6/2003 | Cambot et al. |
| 6,643,635 B2 | 11/2003 | Nwabueze |
| 6,647,392 B1 | 11/2003 | Tagg |
| 6,654,770 B2 | 11/2003 | Kaufman |
| 6,691,281 B1 * | 2/2004 | Sorge et al. ................... 715/234 |
| 6,768,994 B1 | 7/2004 | Howard et al. |
| 6,775,675 B1 * | 8/2004 | Nwabueze et al. ............ 707/100 |
| 6,792,540 B1 * | 9/2004 | Smith et al. ................... 726/31 |
| 6,826,597 B1 | 11/2004 | Lonnroth et al. |
| 6,889,210 B1 * | 5/2005 | Vainstein ........................ 705/57 |
| 6,915,289 B1 | 7/2005 | Malloy et al. |
| 6,917,937 B1 | 7/2005 | Rubendall |
| 6,970,639 B1 * | 11/2005 | McGrath et al. ............. 386/290 |
| 6,993,533 B1 * | 1/2006 | Barnes .......................... 707/102 |
| 7,003,506 B1 * | 2/2006 | Fisk et al. ........................ 707/1 |
| 7,015,911 B2 * | 3/2006 | Shaughnessy et al. ....... 345/440 |
| 7,155,439 B2 | 12/2006 | Cope |
| 7,181,478 B1 * | 2/2007 | Korson et al. ................. 707/667 |
| 7,310,687 B2 * | 12/2007 | Psounis et al. ................ 709/247 |
| 2001/0034679 A1 * | 10/2001 | Wrigley ........................... 705/35 |
| 2001/0042080 A1 * | 11/2001 | Ross .............................. 707/506 |
| 2002/0035501 A1 | 3/2002 | Handel et al. |
| 2002/0042687 A1 * | 4/2002 | Tracy et al. ................... 702/119 |
| 2002/0052954 A1 | 5/2002 | Polizzi et al. |
| 2002/0069077 A1 * | 6/2002 | Brophy et al. .................... 705/1 |
| 2002/0073114 A1 * | 6/2002 | Nicastro et al. .............. 707/500 |
| 2002/0140699 A1 | 10/2002 | Miyadai |
| 2003/0004272 A1 * | 1/2003 | Power ........................... 525/192 |
| 2003/0023476 A1 | 1/2003 | Gainey |
| 2003/0027038 A1 * | 2/2003 | Tsukamoto et al. .......... 429/122 |
| 2003/0028451 A1 | 2/2003 | Ananian |
| 2003/0046264 A1 | 3/2003 | Kauffman |
| 2003/0050919 A1 | 3/2003 | Brown et al. |
| 2003/0050927 A1 | 3/2003 | Hussam |
| 2003/0074456 A1 | 4/2003 | Yeung et al. |
| 2003/0085818 A1 * | 5/2003 | Renton et al. ................. 340/945 |
| 2003/0101201 A1 | 5/2003 | Saylor et al. |
| 2003/0106016 A1 * | 6/2003 | Kendrick et al. ........... 715/500.1 |
| 2003/0115207 A1 | 6/2003 | Bowman et al. |
| 2003/0151621 A1 | 8/2003 | McEvilly et al. |
| 2003/0196121 A1 * | 10/2003 | Raley et al. ................... 713/201 |
| 2003/0208493 A1 * | 11/2003 | Hall et al. ..................... 707/100 |
| 2003/0225747 A1 | 12/2003 | Brown et al. |
| 2004/0024763 A1 | 2/2004 | Anderson |
| 2004/0034615 A1 * | 2/2004 | Thomson et al. ................. 707/1 |
| 2004/0039776 A1 * | 2/2004 | Ballard .......................... 709/203 |
| 2004/0078593 A1 | 4/2004 | Hind et al. |
| 2004/0122730 A1 | 6/2004 | Tucciarone et al. |
| 2004/0133344 A1 * | 7/2004 | Hashida et al. ............... 701/208 |
| 2004/0148237 A1 * | 7/2004 | Bittmann et al. ............... 705/35 |
| 2004/0153649 A1 * | 8/2004 | Rhoads et al. ................ 713/176 |
| 2004/0153969 A1 * | 8/2004 | Rhodes .......................... 715/515 |
| 2004/0168115 A1 * | 8/2004 | Bauernschmidt et al. .... 715/500 |
| 2005/0073578 A1 * | 4/2005 | Odlivak et al. .................. 348/65 |
| 2005/0169496 A1 * | 8/2005 | Perry ............................. 382/100 |
| 2005/0182773 A1 * | 8/2005 | Feinsmith ..................... 707/100 |
| 2005/0182777 A1 * | 8/2005 | Block et al. .................. 707/100 |
| 2005/0183002 A1 * | 8/2005 | Chapus .......................... 715/505 |
| 2005/0262047 A1 * | 11/2005 | Wu et al. .......................... 707/2 |
| 2006/0010060 A1 | 1/2006 | Jones et al. |
| 2006/0041589 A1 * | 2/2006 | Helfman et al. ........... 707/104.1 |
| 2006/0271508 A1 * | 11/2006 | Wu et al. .......................... 707/2 |
| 2006/0277531 A1 * | 12/2006 | Horwitz et al. ............... 717/137 |
| 2007/0073690 A1 * | 3/2007 | Boal et al. ........................ 707/6 |
| 2007/0214112 A1 * | 9/2007 | Towers et al. .................... 707/3 |

FOREIGN PATENT DOCUMENTS

| | | |
|---|---|---|
| EP | 1014283 A1 | 6/2000 |
| EP | 1304630 A2 * | 4/2003 |
| WO | WO 03081388 A2 * | 10/2003 |

OTHER PUBLICATIONS

"Utilizing OLE in Office XP/2000" Create for Mississippi, retrieved from the Internet at <http://www.create.cett, msstate.edu/create/howto/ole.pdf>, document dated Aug. 2001, pp. 1-7.

"eReport Option" Actuate Corporation, retrieved from the Internet at <http://www.actuate.com/download/A8ereportoption.pdf>, document dated 2002, pp. 1-7.

Business Objects™, "InfoView User's Guide," © Business Object 200, Portions © 1996, *Microsoft Corporation*, Editions: 2, XP-001152181, pp. I-XVI, pp. 18-28, 259-296.

Brio Technology, "Secure Business Intelligence with Brio Enterprise," *Brio Technology, Inc.*, Palo alto, CA, Nov. 1998, XP-001152182, pp. 1-20.

* cited by examiner

FIG. 2   LiveOffice enabled exporting and refreshing in Business Objects Enterprise System

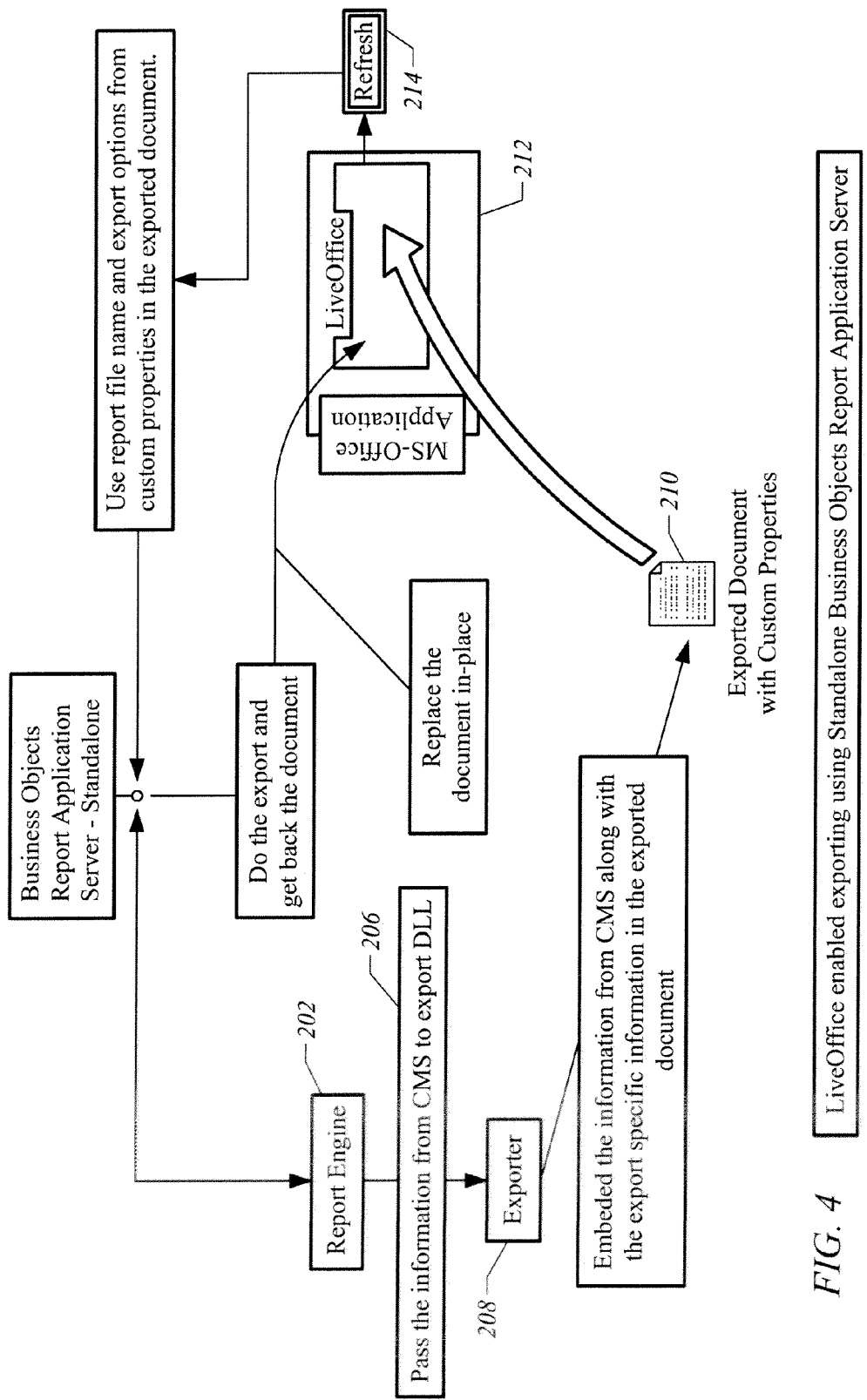
FIG. 4   LiveOffice enabled exporting using Standalone Business Objects Report Application Server

AUGMENTING A REPORT WITH METADATA
FOR EXPORT TO A NON-REPORT
DOCUMENT

CROSS-REFERENCE TO RELATED APPLICATION

This application is a continuation-in-part of U.S. Ser. No. 11/137,710, filed May 24, 2005, now abandoned entitled "Apparatus and Method for Inserting Portions of Reports into Electronic Documents", the contents of which are incorporated by reference. This application also claims priority to the U.S. Ser. No. 60/719,790, filed Sep. 23, 2005, entitled "Apparatus and Method for Augmenting a Report with Metadata for Export to a Non-Report Document", the contents of which are incorporated by reference.

FIELD OF THE INVENTION

The present invention relates generally to utilizing electronic reports. More particularly, the present invention relates to utilizing electronic reports in non-report documents.

BACKGROUND OF THE INVENTION

There are a number of commercially available products to produce reports from stored data. For instance, Business Objects Americas of San Jose, Calif., sells a number of widely used report generation products, including Crystal Reports™, Business Objects OLAP Intelligence™, and Business Objects Enterprise™. As used herein, the term report refers to information automatically retrieved (i.e., in response to computer executable instructions) from a data source (e.g., a database, a data warehouse, and the like), where the information is structured in accordance with a report schema that specifies the form in which the information should be presented. A non-report is an electronic document that is constructed without the automatic retrieval (i.e., in response to computer executable instructions) of information from a data source. Examples of non-report electronic documents include typical business application documents, such as a word processor document, a spreadsheet document, a presentation document, and the like.

A report document is generally created by a specialized tool including executable instructions to access and format data. A report document where the content does not include external data, either saved within the report or accessed live, is a template document for a report rather than a report document. Unlike, other non-report documents that may optionally import external data within a document, a report document by design is primarily a medium for accessing, formatting, and presenting external data.

A report design tool contains executable instructions specifically designed to facilitate working with external data sources. In addition to instructions regarding external data source connection drivers, these instructions may include advanced filtering of data, instructions for combining data from different external data sources, instructions for updating join structures and relationships in report data, and instructions including logic to support a more complex internal data model (that may include additional constraints, relationships, and metadata).

In contrast to a spreadsheet type application, a report generation tool generally is not limited to a table structure but can support a range of structures. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. Spreadsheet applications work within a looping calculation model, whereas report generation tools may support a range of calculation models. Although there may be an overlap in the function of a spreadsheet document and a report document, the applications used to generate these documents contain instructions with different assumptions concerning the existence of an external data source and different logical approaches to interpreting and manipulating imported data.

The commonly owned parent patent application entitled "Apparatus and Method for Inserting Portions of Reports into Electronic Documents", U.S. Ser. No. 11/137,710, filed May 24, 2005, discloses techniques for adding metadata to a portion of a report and then exporting the portion of the report and the associated metadata to a non-report electronic document. The contents of the foregoing application are incorporated herein by reference. It would be highly desirable to extend the functionality of the technology described in the foregoing application to include entire reports. In particular, it would be highly desirable to export entire reports into non-report electronic documents, while still allowing refresh and related operations on the exported report.

It is against this background that a need arose to develop the apparatus and method described herein.

SUMMARY OF THE INVENTION

The invention includes a computer readable medium with executable instructions to create a report; augment the report with metadata including a report identifier and parameter information; and export the report and metadata to a non-report electronic document.

The invention also includes a computer readable medium with executable instructions to receive at a non-report electronic document a report with metadata; and analyze the metadata to initiate a refresh of the report.

BRIEF DESCRIPTION OF THE DRAWINGS

For a better understanding of the nature and objects of the invention, reference should be made to the following detailed description taken in conjunction with the accompanying drawings, in which:

FIG. 4 illustrates components and process flow associated with an alternate embodiment of the invention.

Like reference numerals refer to corresponding parts throughout the several views of the drawings.

DETAILED DESCRIPTION

Figure 1:
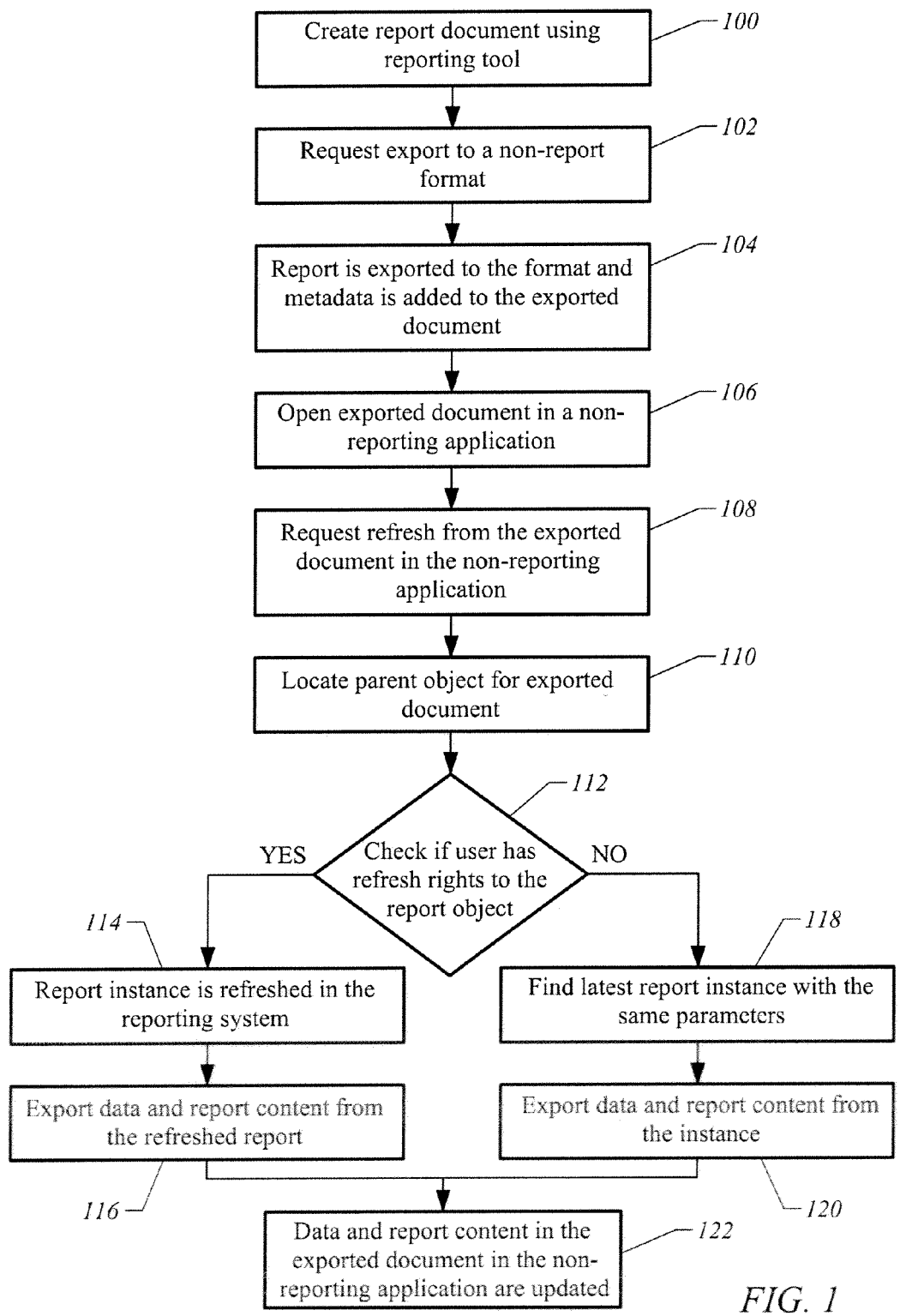
FIG. 1 illustrates processing operations associated with an embodiment of the invention.

FIG. 1 illustrates processing operations associated with an embodiment of the invention. Initially, a report document is created using a reporting tool 100. A request is then processed for the export of the report to a non-report document. Metadata is then added to the report. Various forms of metadata used in accordance with embodiments of the invention are discussed below. The report and the metadata are then exported 104. The report and the metadata are then opened in a non-reporting application 106. The non-reporting application may be on the same computer or a different computer than the computer that generated the report. Typically, one computer will generate a report and export the report (with the metadata) over a network to a second computer. Next, a request to refresh the report is processed 108. The parent object for the exported document is then located 110. A check is then made to determine if the user has refresh rights to the report object 112. If so, the report instance is refreshed in the reporting system 114. The data and report content from the refreshed report is then exported to the non-report document 116. If the user does not have refresh rights, the latest report instance with the same parameters is identified 118. Data and report content from this instance is then exported to the non-report document 116. Finally, data and report content in the non-report document are updated 122.

The invention combines functionality from a reporting system in terms of creating the export document and coordinating a report refresh with functionality in a non-reporting application such as Microsoft Word™ or Excel™. The report document is exported in order to be compatible with these non-reporting applications. Metadata regarding the original source report and its data sources is added to the exported document. At a minimum, the metadata provides information for identifying the source report and the parameters used within the source report. It can include additional metadata such as report server name, drill down path information, export dll information, export format and options, prompts for the report, logon information (UserID, but not password stored), report language, etc. The metadata system is extensible.

With the exported document open in the non-reporting application, it is possible to trigger a refresh of the source report (or to open an existing instance of the report document) and to import the updated data/report content into the exported document within the non-reporting application.

Refresh options are based on having permission to refresh the report object. In one implementation, an additional range of options exist for selecting whether to refresh the non-report document by refreshing the report, accessing the latest report instance, or selecting a specific report instance. Additionally, options for how to handle the refresh in the non-report document include: replacing all of the existing report content, inserting the new report content in a new page, creating trending information based on the original report data as it compares with the updated report data, maintaining modifications in the non-report document including formatting changes to the original report data and additional content.

Figure 2:
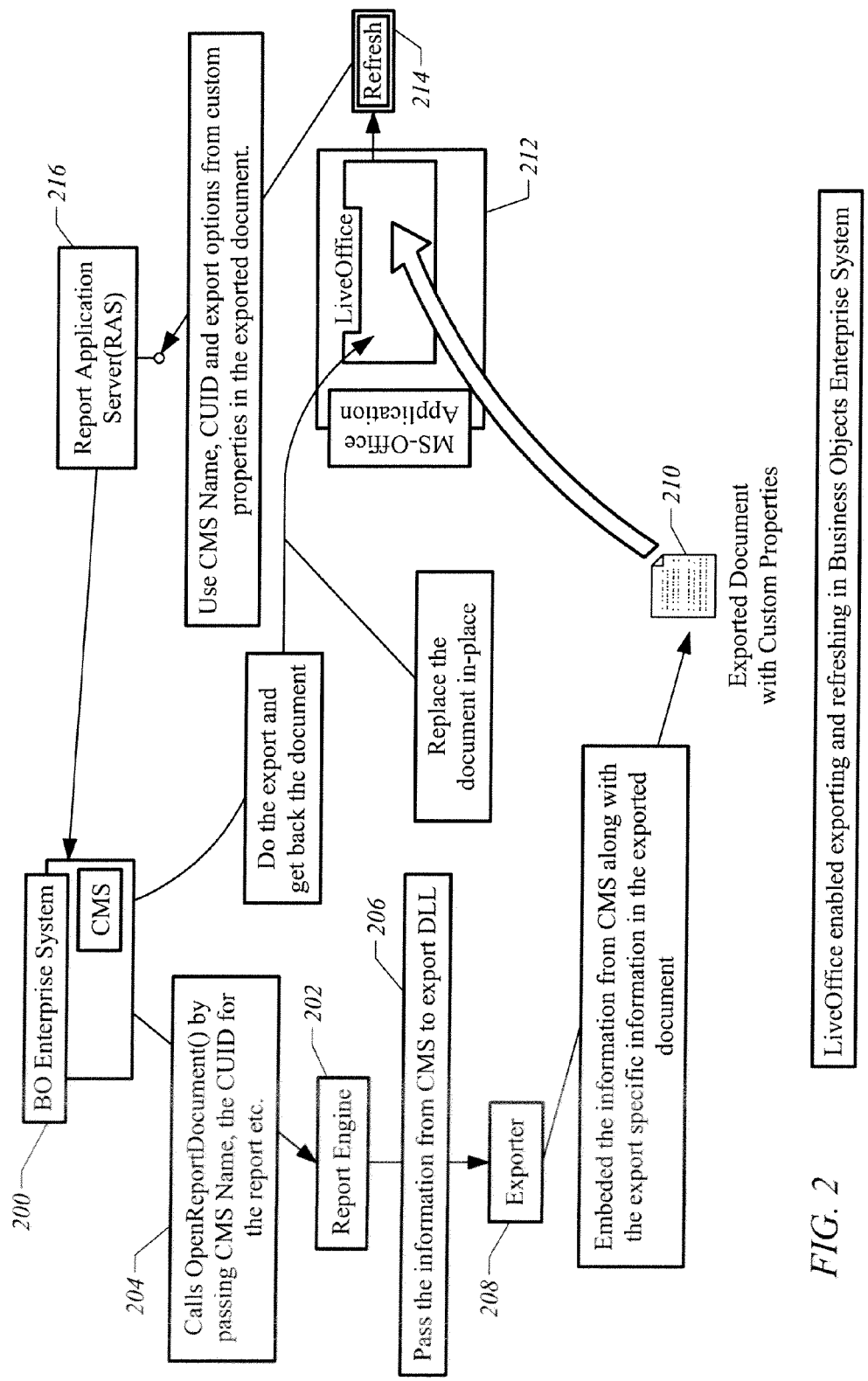
FIG. 2 illustrates components and process flow associated with an embodiment of the invention.

FIG. 2 provides a more detailed overview of components and processing operations associated with an embodiment of the invention. The following example is in the context of non-reporting applications sold by Microsoft Corporation, Redmond, Wash., and reporting applications sold by Business Objects Americas, San Jose Calif. To enable the exported documents for Microsoft's LiveOffice product, some custom information is embedded in the exported document, during the export time. This custom information is subsequently used by LiveOffice.

The processing associated with FIG. 2 can be characterized as follows:
a. When a Business Objects Enterprise server 200 opens a report document using a Report Engine 202, it passes in information 204 about the server name (e.g., the name of the CMS server) and the CUID (i.e., the report ID) of the report.
b. The Report Engine 202 then stores this information. When an export call is made from the Business Objects Enterprise side, Report Engine 202 passes this information 206.
c. The Exporter or Export DLL 208 then uses this information and appends any additional information (like the export format DLL name, the format type, the format options, etc.) and creates a string in a pre-determined syntax. The syntax of this string is mutually agreed upon between the export DLL 208 and the non-report application (e.g., LiveOffice 212). This string is then encrypted and embedded in the exported document as a custom property. LiveOffice exporting is enabled by default, but can be turned off. This results in an exported document with custom properties 210.

Figure 3:
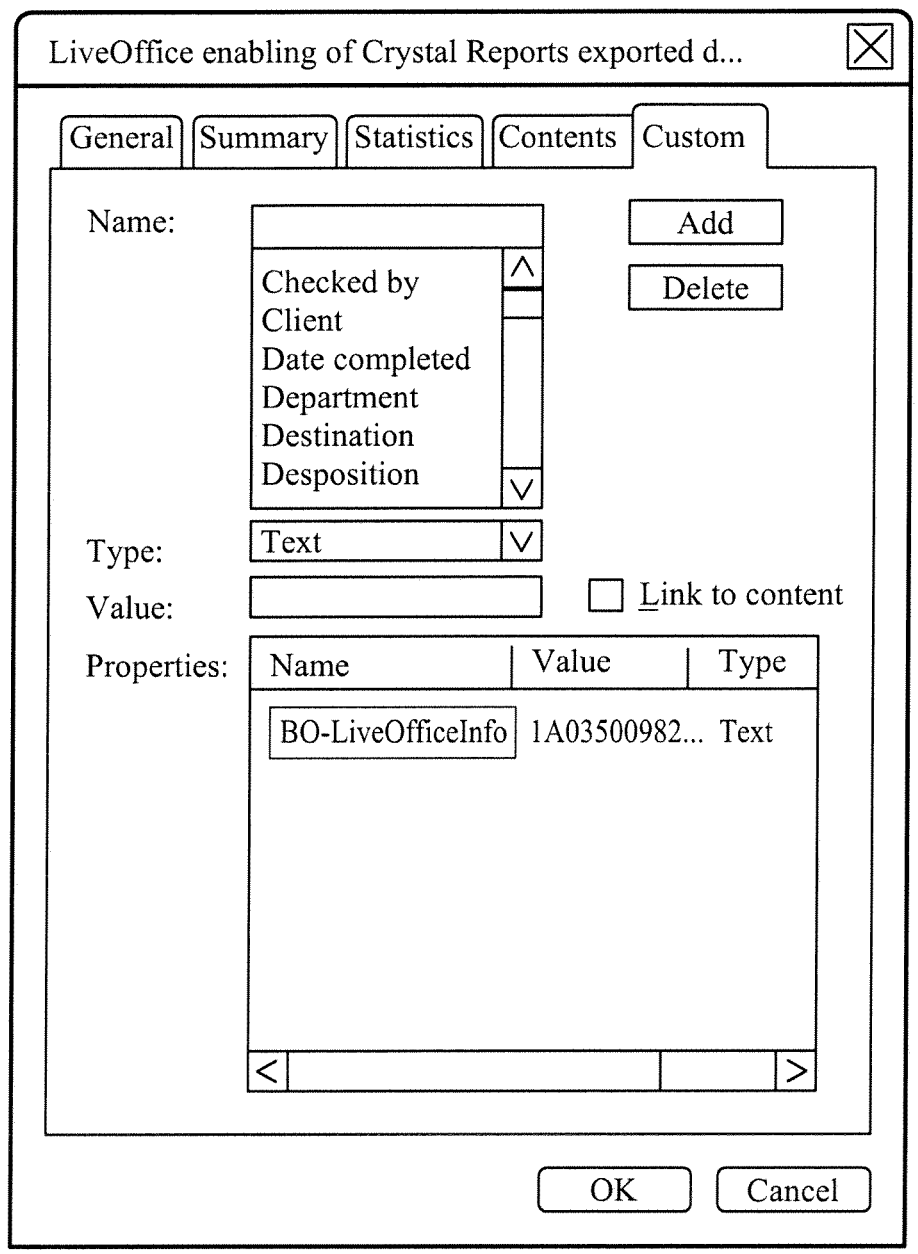
FIG. 3 illustrates a graphical user interface that may be used in accordance with an embodiment of the invention.

FIG. 3 illustrates an example of the custom property for the exported document when opened in a non-report application (e.g., an MS-Office application). FIG. 3 illustrates a properties field with a BO-LiveOfficeInfo file specified. Note that the property is encrypted for security purposes. The custom property set like this does not create any compatibility problems in the exported document, as it does not affect the data area of the document.

Returning to FIG. 2, the exported document is processed as follows.
d. A user opens the document in a non-report application 212 (e.g., MS-Office that has a LiveOffice plug-in). In LiveOffice, along with other UI elements, there is an option to 'Refresh' 214 the document.
e. LiveOffice then reads the custom property from the document and decrypts it (the encryption method is also mutually agreed upon between export DLL and LiveOffice). Once decrypted, it parses the string and then talks (e.g., through a report application server 216) to the specified server (e.g., CMS server 200) with the relevant information. Then it gets the document re-exported through Business Objects Enterprise 200 and replaces the document in-place in the MS-Office application 212.

Within the LiveOffice context, when the meta-data for the report is accessed, the parent object for the report is identified and located. If the user has refresh rights, the report object is used to refresh and get the latest context. If the user does not have refresh rights, the latest report instance running with the same parameter values is used to get the new content.

FIG. 4 illustrates an unmanaged LiveOffice implementation in which the BO-Enterprise system is absent. Therefore, the server Name and the report CUID are not used. Instead the 'report name' and optionally report parameters are used. The LiveOffice client uses the report name embedded in the exported document to refresh. Other than this difference, the rest of this workflow is same as in FIG. 2.

The unmanaged LiveOffice workflow enables systems that do not include the BO-Enterprise system to create metadata when a report object is exported such that the exported document based on a report document can be refreshed.

The following table lists various metadata that may be attached to a file in accordance with various embodiments of the invention.

| | |
|---|---|
| CMSName | The name of the CMS server. |
| CUID | The CUID (or report ID) for the report in |

| | -continued |
|---|---|
| | the BO-Enterprise |
| LocalReportFileName | The path name of the report file. This will be used by Unmanaged LiveOffice. |
| DrillDownContext<token separator> | The group path of the Drill Down context to use, if the document is exported from a drill down view. This string will have a format like "0-4-6" i.e., numbers separated by hyphen ('-'). |
| ParameterInfo | This is the name and value of the parameters used for the report. The syntax of the <report parameter info> is as follows:<br><param Name>"["<param value>"]" for each parameter. If there is more than one value for the parameter, they are comma separated.<br>For parameters with multiple values, all the values are encoded in a single string. For instance, assume the following case:<br>Country = "Canada"<br>Provinces = "BC", "ON"<br>Cities = "Vancouver", "St, Edwards"<br>The embedded string should be ParameterInfo=<br>Country[Canada]<br>Provinces[BC,ON]<br>Cities[Vancouver,St\002C Edwards] |
| ExportDllId | The name of the export DLL used to create this document. For instance, crxf_xls.dll, crxf_rtf.dll etc. |
| ExportFormatIndex | The index of the export format. For instance, 1 for "RTFEditable" when export DLL is crxf_rtf. |
| ExportOptions | The format options used for the export. This will be a string of properties. If this string contains any of the reserved characters, then they are escaped. |

Embodiments of the invention support refresh operations at a granular level. Individual data elements may be tagged with metadata. This allows identification of specific components in a non-report document that need to be refreshed. Thus, specific sections of a document may be refreshed.

Aspects of the non-report document that are based on imported report content should not be removed when the data is refreshed. The invention supports the export of report information into an existing non-report document (rather than creating a new non-report document). The techniques of the invention may be used to export information from multiple reports into a single non-report document. The exported information may include specific parts of a report (e.g., a specific chart or page). The non-report document may be used to schedule refreshing of select aspects of the report document.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs"), ROM devices, and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. A computer-implemented method comprising:
opening, by a report engine of a report server, a report document, the report server passing information about a server name and a report identification (ID) of the report document;
storing, by the report engine, the passed information;
receiving, the report engine, an export call for the report document from an exporter module;
passing the report document and the stored information to the exporter module;
creating and encrypting, by the export module, a string comprising the stored information and at least one other attribute of the report document; and
encrypting and embedding, by the export module, the string into the report document; and
transmitting the report document to a non-reporting application, the non-reporting application decrypting the string to import the report document into a non-report document.

2. A method as in claim 1 further comprising:
augmenting the report document with metadata including a report identifier and parameter information.

3. A method as in claim 2, wherein augmenting the report document comprises:
augmenting the report document with content level metadata tags to facilitate a refresh of the report document within a non-report electronic document.

4. A method as in claim 2, wherein the metadata to augment the report document is selected from a group consisting of: a report server name, drill down path information, export dynamic link library (dll) information, export format and options, report parameters, report prompts, login information, and report language.

5. A method as in claim 2, further comprising:
refreshing the report document from a latest instance of the report document that has the same parameters that are specified in the metadata.

6. A method as in claim 5, further comprising:
illustrating data changes in the refreshed report document.

7. A method as in claim 5, further comprising:
maintaining security while refreshing the report.

8. A method as in claim 1, wherein the report document comprises a plurality of components, at least one of the plurality of components being tagged with metadata enabling a first portion of the report document to refresh while a second portion of the report document does not refresh.

9. A method as in claim 1, wherein only a portion of the report document is exported.

10. A method as in claim 1, wherein the report document is exported into an existing non-report document.

11. A method as in claim 10, wherein information from a plurality of reports is exported into the existing non-report document.

12. A non-transitory computer readable medium comprising instructions, which when executed by at least one data processor of at least one computing system, result in operations comprising:

opening, by a report engine of a report server, a report document, the report server passing information about a server name and a report identification (ID) of the report document;

storing, by the report engine, the passed information;

receiving, the report engine, an export call for the report document from an exporter module;

passing the report document and the stored information to the exporter module;

creating and encrypting, by the export module, a string comprising the stored information and at least one other attribute of the report document; and encrypting and embedding, by the export module, the string into the report document; and transmitting the report document to a non-reporting application, the non-reporting application decrypting the string to import the report document into a non-report document.

13. A system comprising:

at least one data processor; and memory storing instructions, which when executed by the at least one data processor, result in operations comprising:

opening, by a report engine of a report server, a report document, the report server passing information about a server name and a report identification (ID) of the report document;

storing, by the report engine, the passed information;

receiving, the report engine, an export call for the report document from an exporter module;

passing the report document and the stored information to the exporter module;

creating and encrypting, by the export module, a string comprising the stored information and at least one other attribute of the report document; and encrypting and embedding, by the export module, the string into the report document; and transmitting the report document to a non-reporting application, the non-reporting application decrypting the string to import the report document into a non-report document.

* * * * *